(12) United States Patent
Baek

(10) Patent No.: US 11,568,631 B2
(45) Date of Patent: Jan. 31, 2023

(54) METHOD, SYSTEM, AND NON-TRANSITORY COMPUTER READABLE RECORD MEDIUM FOR EXTRACTING AND PROVIDING TEXT COLOR AND BACKGROUND COLOR IN IMAGE

(71) Applicant: LINE Plus Corporation, Seongnam-si (KR)

(72) Inventor: Seunghoon Baek, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 29 days.

(21) Appl. No.: 17/204,472

(22) Filed: Mar. 17, 2021

(65) Prior Publication Data

US 2021/0303905 A1 Sep. 30, 2021

(30) Foreign Application Priority Data

Mar. 30, 2020 (KR) ........................ 10-2020-0038295

(51) Int. Cl.
| | | |
|---|---|---|
| *G06V 10/56* | (2022.01) | |
| *G06K 9/62* | (2022.01) | |
| *G06V 10/50* | (2022.01) | |
| *G06V 20/62* | (2022.01) | |
| *G06V 30/148* | (2022.01) | |

(Continued)

(52) U.S. Cl.
CPC ........... *G06V 10/56* (2022.01); *G06K 9/6223* (2013.01); *G06T 7/90* (2017.01); *G06V 10/50* (2022.01); *G06V 20/62* (2022.01); *G06V 30/153* (2022.01); *G06V 30/10* (2022.01)

(58) Field of Classification Search
CPC ...... G06V 10/56; G06V 10/50; G06V 30/153; G06V 30/10; G06V 20/62; G06K 9/6223; G06T 7/90
See application file for complete search history.

(56) References Cited

U.S. PATENT DOCUMENTS

| | | | | |
|---|---|---|---|---|
| 6,014,183 A | * | 1/2000 | Hoang ................... | H04N 7/181 348/E7.086 |
| 2008/0069442 A1 | * | 3/2008 | Itoh .......................... | G06T 5/40 382/167 |

(Continued)

FOREIGN PATENT DOCUMENTS

| | | |
|---|---|---|
| JP | 2007-79946 A | 3/2007 |
| JP | 2015-69234 A | 4/2015 |

(Continued)

OTHER PUBLICATIONS

Communication dated Oct. 21, 2021 by the Korean Intellectual Property Office in Korean Application No. 10-2020-0038295.

*Primary Examiner* — Casey L Kretzer
(74) *Attorney, Agent, or Firm* — Sughrue Mion, PLLC

(57) ABSTRACT

A method for extracting and providing a text color and background color in an image, includes detecting a first area that includes a text in a given image; extracting, from the first area, a representative text color that represents the text and a representative background color that represents a background of the first area; and overlaying a second area that includes a translation result of the text on the given image and applying the representative text color and the representative background color to a text color and a background color of the second area.

20 Claims, 12 Drawing Sheets

(51) Int. Cl.
 *G06T 7/90* (2017.01)
 *G06V 30/10* (2022.01)

(56) References Cited

U.S. PATENT DOCUMENTS

2018/0018795 A1* 1/2018 Li .................. G06F 3/04847
2019/0266432 A1* 8/2019 Lee .................. G06V 10/17

FOREIGN PATENT DOCUMENTS

KR         10-1793653 B1    11/2017
KR    10-2020-0009205 A     1/2020

\* cited by examiner

| Red | Red | Red | Light Green | Blue | Red |
|---|---|---|---|---|---|
| Light Red | Orange | Green | Blue | Blue | Red |
| Bold Red | Bold Red | Blue | Light Blue | Bold Blue | Blue |

Clustering result

| 1 | 1 | 1 | 1 | 2 | 1 |
|---|---|---|---|---|---|
| 1 | 1 | 2 | 2 | 2 | 1 |
| 1 | 1 | 2 | 2 | 2 | 2 |

1 = Shades of red color
2 = shades of blue color

```
Text base color = (Rp1, Gp1, Bp1)
Background base color = (Rp2, Gp2, Bp2)

For text base color
=====================
(color) = count, distance from (Rp1, Gp1, Bp1)
(R1, G1, B1) = 10234, 180
(R3, G3, B3) = 6878, 200
(R4, G4, B4) = 2356, 17       ← 121
(R5, G5, B5) = 446, 96
(R2, G2, B2) = 65, 82
...

For background base color
=====================
(color) = count, distance from (Rp2, Gp2, Bp2)
(R1, G1, B1) = 10234, 223
(R3, G3, B3) = 6878, 426
(R4, G4, B4) = 2356, 88
(R5, G5, B5) = 446, 91
(R2, G2, B2) = 65, 23         ← 122
...
```

METHOD, SYSTEM, AND NON-TRANSITORY COMPUTER READABLE RECORD MEDIUM FOR EXTRACTING AND PROVIDING TEXT COLOR AND BACKGROUND COLOR IN IMAGE

CROSS-REFERENCE TO RELATED APPLICATION

This application claims priority under 35 U.S.C. § 119 to Korean Patent Application No. 10-2020-0038295, filed Mar. 30, 2020 in the Korean Intellectual Property Office, the disclosure of which is incorporated herein by reference in its entirety.

BACKGROUND

1. Field

Apparatuses, systems, and methods consistent with example embodiments relate to providing a function of detecting and extracting a text in an image.

2. Description of Related Art

In general, character recognition technology receives an image through a camera, separates a character included in the image from a background, extracts a feature of the character, compares the extracted feature of the character to a feature pattern of a prestored character, and provides a text character of a most similar pattern as a recognition result.

Such general character recognition technology exhibits a high character recognition rate and is being commercialized in the case of recognizing a vehicle license plate or a postal code of a desired standard that uses a limited range of characters or numbers.

Although various types of languages are present in the world, a user may not understand all languages of other countries. Therefore, there is an active research on an automatic translation system that translates even a language the user does not know to a language understandable by the user and provides the translated language to the user.

SUMMARY

Example embodiments may provide an electronic device for translating text that is detected from an image, and displaying a translation result area to be overlaid on a corresponding image, and a method of operating the electronic device.

Further, example embodiments may provide an electronic device for extracting a text color and a background color in a text detection area in an image and applying the extracted text color and background color to a text and a background of a translation result area, and a method of operating the electronic device.

According to an aspect of another example embodiment, there is provided a method implemented by a computer system including at least one processor, the method including: detecting a first area that includes a text in a given image; extracting, from the first area, a representative text color that represents the text and a representative background color that represents a background of the first area; overlaying a second area that includes a translation result of the text on the given image; and applying the representative text color and the representative background color to a text color and a background color of the second area.

The detecting may include detecting the first area using an optical character reader (OCR).

The extracting may include: extracting a histogram for a plurality of pixels of the first area; extracting a text base color and a background base color based on a color distribution of the first area; selecting the representative text color based on a first distance value between the histogram for the plurality of pixels of the first area and the text base color; and selecting the representative background color based on a second distance value between the histogram for the plurality of pixels of the first area and the background base color.

The extracting may further include transforming the first area to a preset form through an image perspective transform algorithm.

The extracting may further include sorting the histogram by size.

The extracting the histogram may include extracting a three-dimensional (3D) histogram according to a color channel combination for the plurality of pixels of the first area.

The extracting the histogram may include quantizing all of pixel values of the first area based on a same base number of multiples.

The extracting the text base color and the background base color may include: clustering the color distribution of the first area using a first color and a second color through a K-mean algorithm; summing a first number of pixels for the first color and a second number of pixels for the second color with respect to a border area of the first area; and in response to the first number of pixels being greater than the second number of pixels, selecting the first color as the background base color and selecting the second color as the text base color.

The selecting the representative text color may include: selecting a first pixel color of which the first distance value is less than or equal to a threshold as the representative text color, wherein the selecting the representative background color may include: selecting a second pixel color of which the second distance value is less than or equal to the threshold as the representative background color.

The method may further include: increasing the threshold in response to absence of a pixel less than or equal to the threshold.

The method may further include: extracting a representative object color of an image object; and applying the representative object color as a color that constitutes a user interface (UI) associated with the image object.

The method may further include: extracting a representative icon color of an icon and applying the representative icon color as a background theme color.

The method may further include: extracting a representative previous frame color and a representative current frame color from a previous frame and a current frame of a video, respectively; and detecting a scene change based on a difference between the representative previous frame color and the representative current frame color.

According to an aspect of another example embodiment, there is provided a non-transitory computer-readable record medium storing instructions that, when executed by the at least one processor to perform the method implemented by the computer system.

According to an aspect of another example embodiment, there is provided a computer system including: at least one processor configured to execute computer-readable instructions stored in a memory, to: detect a first area that includes a text in a given image; extract, from the first area, a representative text color that represents the text and a representative background color that represents a background of the first area; overlay a second area that includes a translation result of the text on the given image; and apply the representative text color and the representative background color to a text color and a background color of the second area.

The at least one processor is further configured to execute computer-readable instructions to: extract a histogram for a plurality of pixels of the first area, extract a text base color and a background base color based on a color distribution of the first area, select the representative text color based on a first distance value between the histogram for a plurality of pixels of the first area and the text base color, and select the representative background color based on a second distance value between the histogram for the plurality of pixels of the first area and the background base color.

The at least one processor may be further configured to execute computer-readable instructions to: extract a three-dimensional (3D) histogram according to a color channel combination for a plurality of pixels of the first area.

The at least one processor may be further configured to execute computer-readable instructions to: quantize all of pixel values of the first area based on multiples having a same base number.

The at least one processor may be further configured to execute computer-readable instructions to: cluster the color distribution of the first area using a first color and a second color through a K-mean algorithm, sum a first number of pixels for each of the first color and a second number of pixels for the second color with respect to a border area of the first area, and in response to the first number of pixels being greater than the second number of pixels, select the first color as the background base color and select the second color as the text base color.

The at least one processor may be further configured to execute computer-readable instructions to: select a first pixel color of which the first distance value is less than or equal to a threshold as the representative text color, and select a second pixel color of which the second distance value is less than or equal to the threshold as the representative background color.

BRIEF DESCRIPTION OF THE DRAWINGS

The above and/or other aspects will be more apparent by describing certain example embodiments, with reference to the accompanying drawings, in which:

FIG. 7 illustrates an example of a histogram extraction process according to at least one example embodiment;

FIG. 12 illustrates an example of a representative color selection process according to at least one example embodiment.

Figure 1:
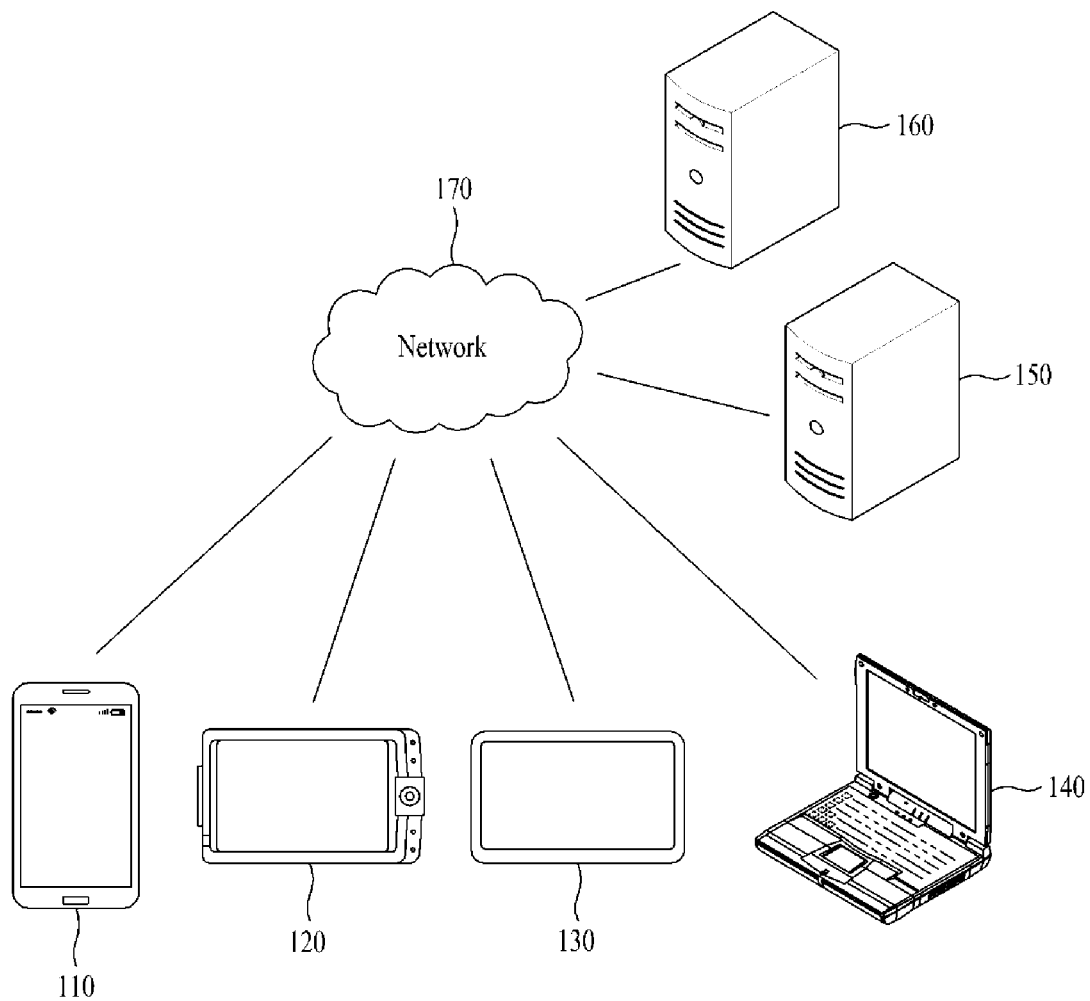
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blu-ray/ DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to forward and/or distribute the computer programs, program code, instructions, or some combination thereof, over a network. The remote computing system may forward and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for providing a function of detecting and translating a text in an image.

The disclosures described herein may provide a translation result area including a text color and a background color extracted from a text detection area to be overlaid on a corresponding image in providing a function of detecting and translating a text in the image and, through this, may apply a color most similar to an original image and minimize sense of disparity for the translation result area.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed/stationary terminal or a mobile terminal that is configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a computer system, or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, for example, the server 150 may provide, as the first service, a service (e.g., an image-based translation service) intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
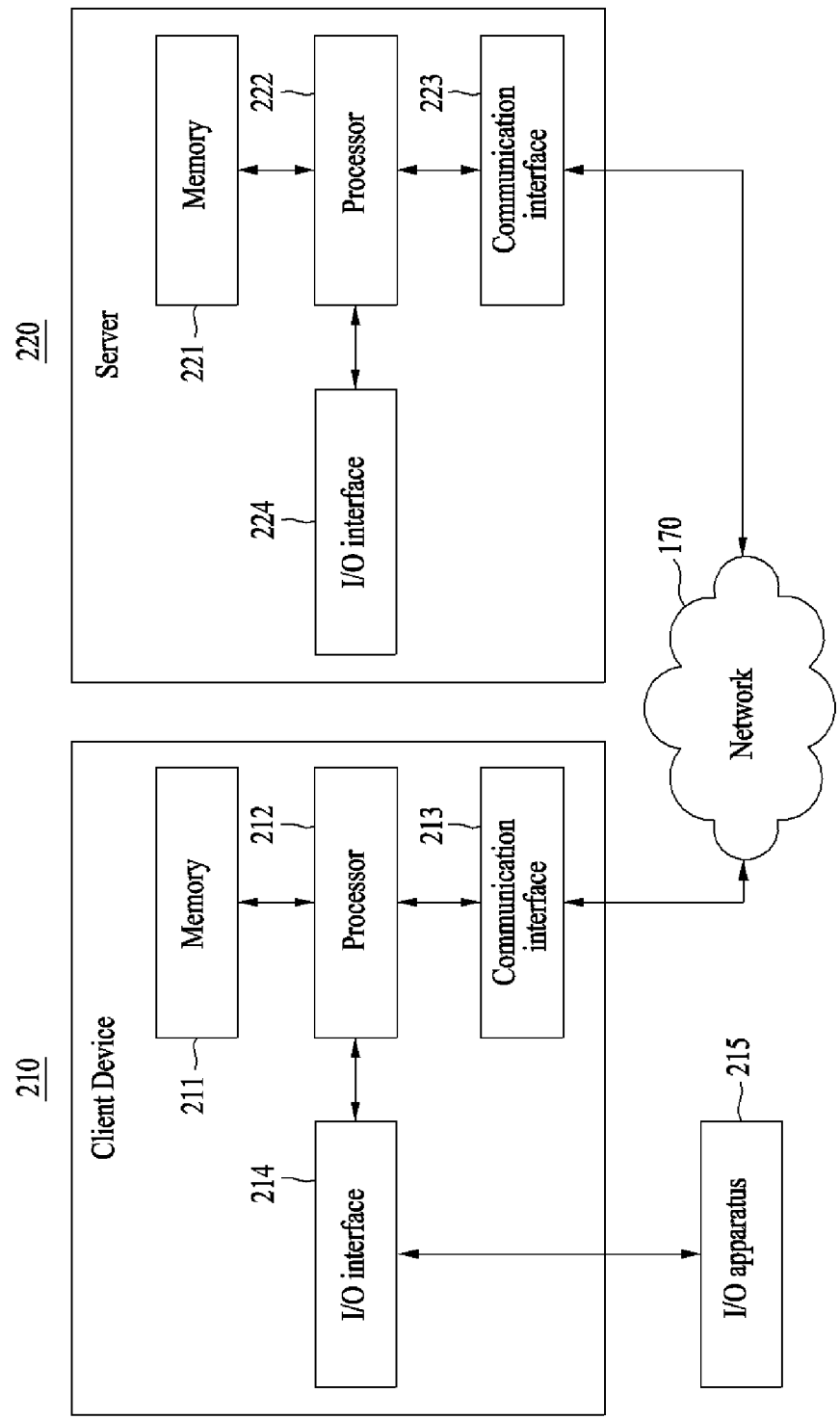
FIG. 2 is a diagram illustrating an example of an electronic device and a server according to at least one example embodiment.

FIG. 2 is a block diagram illustrating an example of a client device 210 and a server 220 according to example embodiments. The client device 210 may correspond to any of the electronic devices 110, 120, 130, and 140 shown in FIG. 1, and the server 220 may correspond to any of the servers 150 and 160 shown in FIG. 1.

Referring to FIG. 2, the client device 210 may include a memory 211, a processor 212, a communication interface 213, and an input/output (I/O) interface 214, and the server 220 may include a memory 221, a processor 222, a communication interface 223, and an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as ROM, SSD, flash memory, and disk drive, may be included in the client device 210 or the server 220 as a permanent storage device separate from the memory 211, 221. Also, an OS or at least one program code, for example, a code for a browser installed and executed on the client device 210 or an application installed and executed on the client device 210 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication interface 213, 223, instead of the non-transitory computer-readable record medium. For example, at least one program may be loaded to the memory 211 of the client device 210 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication interface 213, 223 to the processor 212, 222. For example, the processor 212, 222 may be configured to execute received instructions in response to the program code stored in the storage device, such as the memory 211, 221.

The communication interface 213, 223 may provide a function for communication between the client device 210 and the server 220 over the network 170 and may provide a function for communication between the client device 210 and another client device or another server, and between the server 220 and another client device or server. For example, the processor 212 of the client device 210 may transfer a request created based on a program code stored in the storage device such as the memory 211, to the server 220 over the network 170 under control of the communication interface 213. The client device 210 may receive a control signal, an instruction, content, a file, etc., provided under control of the processor 222 of the server 220 through the communication interface 213 of the client device 210, from the communication interface 223 of the server 220. For example, a control signal, an instruction, content, a file, etc., of the server 220 received through the communication interface 213 may be transferred to the processor 212 or the memory 211, and content, a file, etc., may be stored in a storage medium, for example, the permanent storage device, further includable in the client device 210.

The I/O interface 214 may be a device used for interface with an I/O apparatus 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the client device 210. Also, the I/O interface 224 of the server 220 may be a device for interface with an apparatus for input or output that may be connected to the server 220 or included in the server 220. In detail, when the processor 212 of the client device 210 processes an instruction of a computer program loaded to the memory 221, content or a service screen configured based on data provided from the server 220 or the electronic device 120 may be displayed on the display through the I/O interface 214.

According to other example embodiments, the client device 210 and the server 220 may include a smaller or greater number of components than a number of components shown in FIG. 2. However, there is no need to clearly illustrate many components according to the related art. For example, the client device 210 may include at least a portion of the I/O apparatus 215, or may further include other components, for example, a transceiver, a global positioning system (GPS) module, a camera, a variety of sensors, a database (DB), and the like. In detail, if the client device 210 is a smartphone, the client device 210 may be configured to further include a variety of components, for example, an accelerometer sensor, a gyro sensor, a camera module, various physical buttons, a button using a touch panel, an I/O port, a vibrator for vibration, etc., which are generally included in the smartphone.

Hereinafter, example embodiments of a method and a system for extracting and providing a text color and a background color in an image are described.

Figure 3:
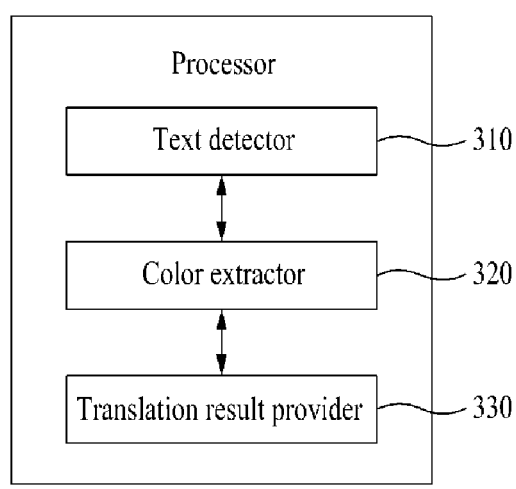
FIG. 3 is a diagram illustrating an example of components includable in a processor of a server according to at least one example embodiment.
Figure 4:
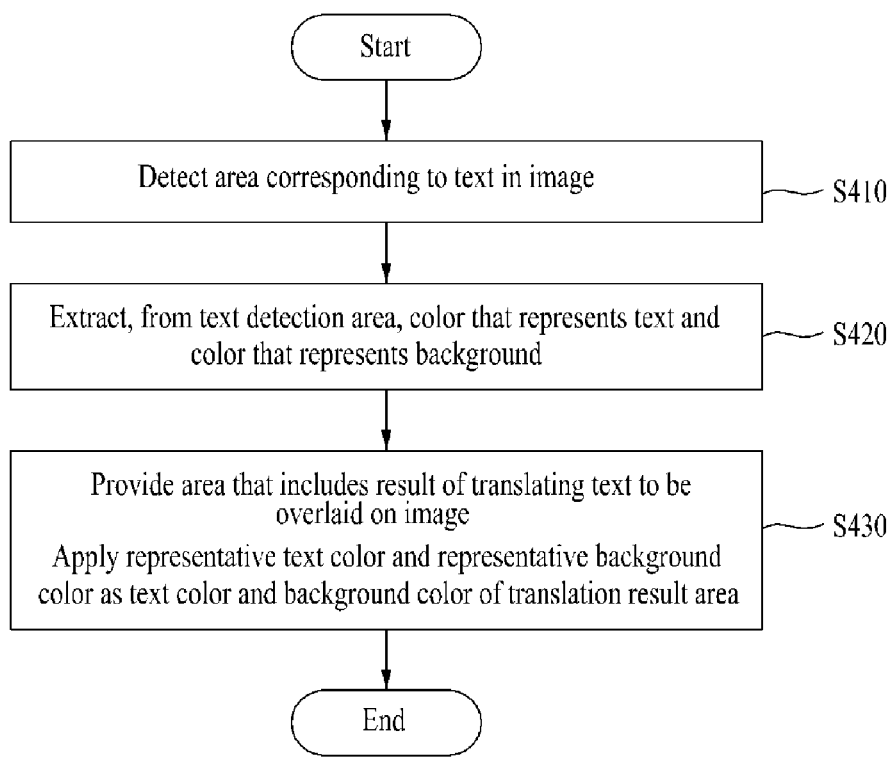
FIG. 4 is a flowchart illustrating an example of a method performed by a server according to at least one example embodiment.

FIG. 3 is a diagram illustrating an example of components includable in a processor of a server according to at least one example embodiment, and FIG. 4 is a flowchart illustrating an example of a method performed by a server according to at least one example embodiment.

The server 150 disclosed herein serves as a platform to provide an image-based translation service. A computer-implemented translation result providing system may be configured in the server 220. The server 220 may provide an image-based translation service to the plurality of electronic devices 110, 120, 130, and 140 and may provide a function of detecting and translating a text in an image through exclusive software application installed on the electronic devices 110, 120, 130, and 140 or connection to a web/mobile site associated with the server 220. In particular, the server 220 may provide a translation result area of a text color and a background color extracted from a text detection area in the image to be overlaid on the corresponding image.

Referring to FIG. 3, to perform a translation result providing method of FIG. 4, the processor 222 of the server 220 may include a text detector 310, a color extractor 320, and a translation result provider 330. Depending on example embodiments, the components of the processor 222 may be selectively included in or excluded from the processor 222. Also, depending on example embodiments, the components of the processor 222 may be separated or merged for representations of functions of the processor 222.

The processor 222 and the components of the processor 222 may control the server 220 to perform operations S410 to S430 included in the translation result providing method of FIG. 4. For example, the processor 222 and the components of the processor 222 may be configured to execute an instruction according to a code of at least one program and a code of an OS included in the memory 221.

Here, the components of the processor 222 may be representations of different functions of the processor 222 performed by the processor 222 in response to an instruction provided from the program code stored in the server 150. For example, the text detector 310 may be used as a functional representation of the processor 222 that controls the server 220 to detect a text in an image in response to the instruction.

The processor 222 may read one or more computer readable from the memory 221 to control the electronic device 110. In this case, the read instructions may include an instruction for controlling the processor 222 to perform the following operations S410 to S430. The following operations S410 to S430 may be performed in order different from that of FIG. 4. A portion of operations S410 to S430 may be omitted or an additional process may be further included.

Although it is described below that the translation result providing method of FIG. 4 is performed by the server 150, it is provided as an example only. At least a portion of operations S410 to S430 included in the translation result providing method may be performed by the electronic device 110.

Referring to FIG. 4, in operation S410, the text detector 310 may detect, from an image uploaded from the electronic device 110, or displayed on the electronic device 110, an area (hereinafter, a text detection area) including a text. The processor 222 may provide an image-based text translation function and may detect a text portion to be translated in the image based on character recognition technology, such as, for example, an optical character reader (OCR). The text detector 310 may designate the text portion in the image using a rectangular box area and may output text box information that includes a coordinate value of the text detection area on the image. For example, the text box information may include left upper-end coordinates, right upper-end coordinates, left lower-end coordinates, and right lower-end coordinates.

As another example, the text detection function may be performed by the electronic device 110. Here, the text detector 310 may receive text box information as a text detection result with the image from the electronic device 110.

In operation S420, the color extractor 320 may extract, from the text detection area, a color (hereinafter, referred to as a 'representative text color') that represents a text and a color (hereinafter, referred to as a 'representative background color') that represents a background. The color extractor 320 may derive a most suitable representative text color and representative background color through a series of image processing processes for a specific area, that is, the text detection area in the image. The color extractor 320 may receive the image and coordinates of the text detection area in the image, may search an area of the coordinates as a color extraction target area, and may extract the representative text color and the representative background color. A color extraction process is further described below.

In operation S430, the translation result provider 330 may provide an area (hereinafter, a translation result area) that includes a result of translating the text in the image to be overlaid on the corresponding image. The translation result provider 330 may include a translation engine and may translate the text detected from the image to a requested language using the translation engine. Here, the translation engine may provide a statistics-based machine translation or an artificial neural network machine translation and may be generated through learning using a machine learning scheme, such as, for example, a deep machine learning. Depending on example embodiments, another server, for example, the server 160 interactable with the server 150 may perform a translation. In this case, a translation request for the text detected from the image may be transferred to the server 160 and the server 160 may translate the text through a translation engine included in the server 160 and may provide a translation result to the translation result provider 330. The translation result provider 330 may overlay a translation result area on an original image and a user of the electronic device 110 may verify the image that includes the translation result area.

In particular, the translation result provider 330 may apply the representative text color and the representative background color extracted in operation S420 as a text color and a background color of the translation result area in displaying the translation result area to be overlaid on the image. The translation result provider 330 may use the color that represents the text and the color that represents the background in the text detection area in the image as a text color and a background color of the translation result area.

Figure 5:
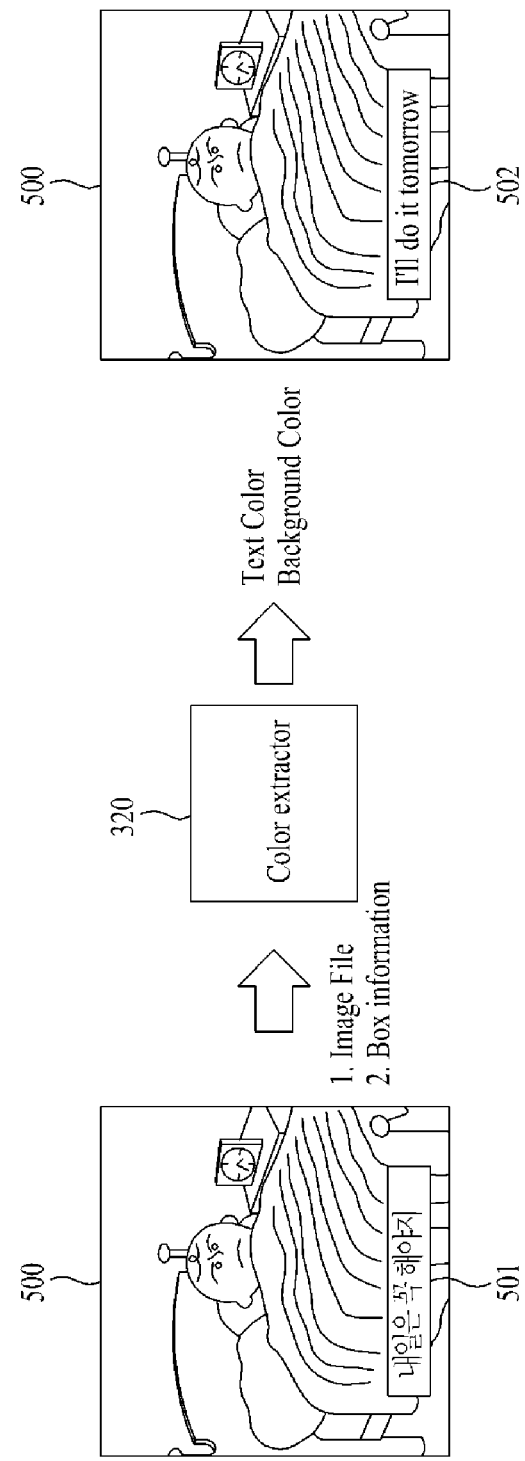
FIG. 5 illustrates an example of a scenario of using a function of detecting and translating a text in an image according to at least one example embodiment.

For example, referring to FIG. 5, the color extractor 320 may receive an image file and text box information that includes a coordinate value of a text detection area 501 for an image 500, and may extract a representative text color and a representative background color through a series of image processing by searching the text detection area 501 based on the text box information in the image 500. Here, the translation result provider 330 may display a text color and a background color of a translation result area 502 to be overlaid on the image 500 using the representative text color and the representative background color extracted from the text detection area 501, respectively. The translation result area 502 overlaid on the image 500 may be configured to have the same position and size as those of the text detection area 501, which is similar to the text color and the background color.

Therefore, the translation result provider 330 may minimize sense of disparity for the translation result area 502 by applying a text color and a background color, which is most similar to or the same as those of the original image 500, to the translation result area 502.

As another example, the aforementioned translation result providing function may be performed by the electronic device 110. Here, the electronic device 110 may receive, from the server 150, the representative text color and the representative background color with a translation result, and may display the translation result area 502 to be overlaid on the image 500 by applying the representative text color and the representative background color to the translation result area 502.

In an example embodiment, the boundary lines of the text detection area 501 and the translation result area 502 may be omitted. The color extractor 320 may recognize an area surrounded by the boundary lines as the text detection area 501 when the boundary lines exist, or may recognize a predetermined size of an area that covers the original text in the image 500 as the text detection area 501 without using the boundary lines.

Figure 6:
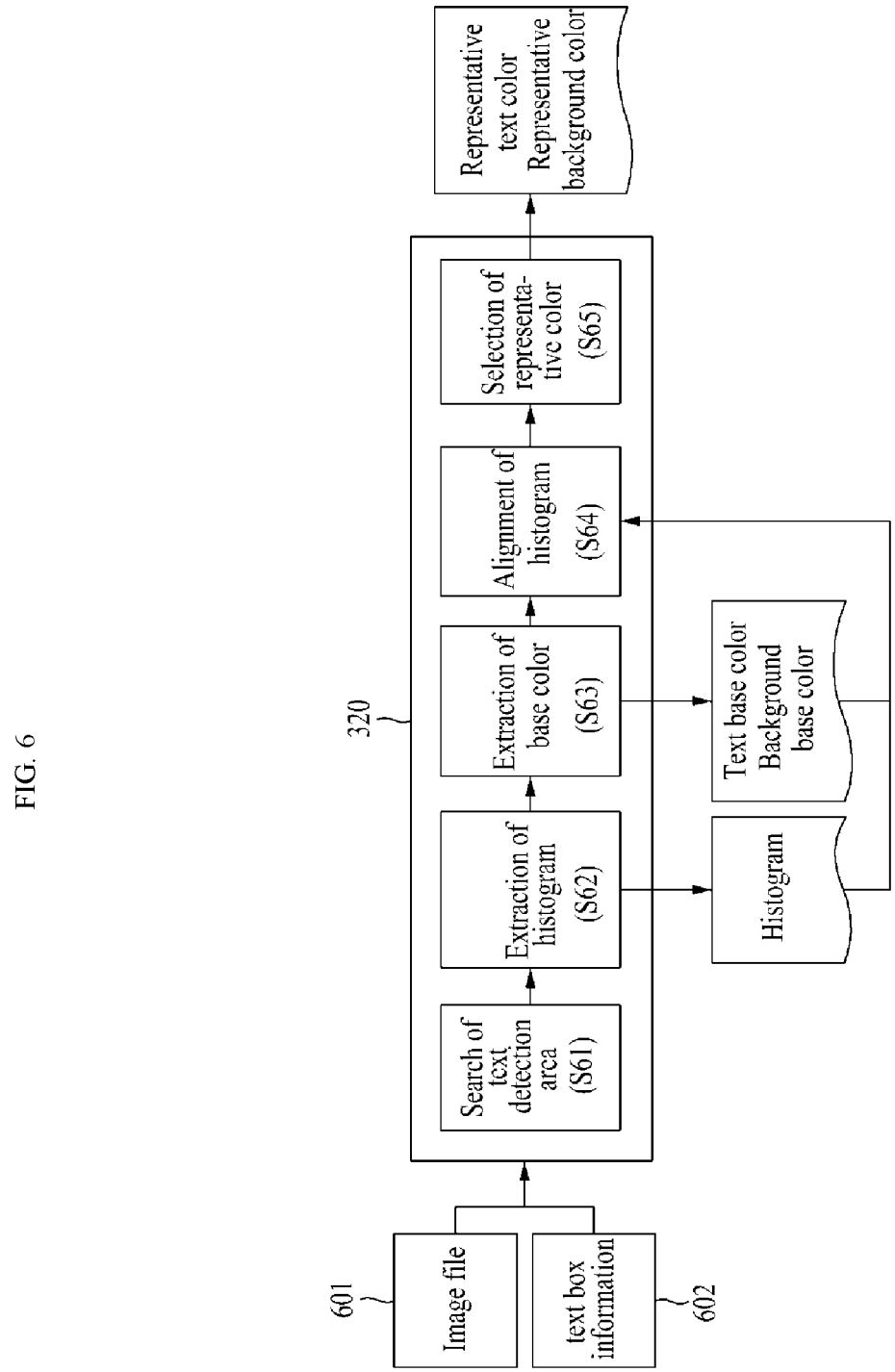
FIG. 6 illustrates an example of a color extraction process according to at least one example embodiment.

FIG. 6 illustrates an example of a color extraction process according to at least one example embodiment.

Referring to FIG. 6, the color extractor 320 may receive an image file 601 and text box information 602 that includes a coordinate value of a text detection area, for example, the text detection area 501, for an image, for example, the image 500.

In operation S61, to search an area for color extraction from the image file 601, the color extractor 320 may search the text detection area 501 based on the text box information 602. The color extractor 320 may receive the image file 601 via a user input or communication with an external device, and may receive the text box information 602. The color extractor 320 may set the text detection area 501 corresponding to the text box information 602 as a region of interest that requires color extraction. Here, the color extractor 320 may transform the text detection area 501 to a rectangular form using an image perspective transform algorithm. The image projective transform algorithm corresponds to a computer vision algorithm that transforms an area in an inclined or crooked shape to a desired or a preset shape, for example, a rectangular shape.

In operation S62, the color extractor 320 may extract a three-dimensional (3D) histogram from the text detection area 501. In the 3D histogram, a color combination is a single element and a number of color combinations is aggregated. For example, referring to FIG. 7, the color extractor 320 may extract a histogram according to a color combination for all of pixels of the text detection area 501. The color extractor 320 may identify that the number of pixels having a first color combination (R1, G1, B1) are 10234, the number of pixels having a second color combination (R2, G2, B2) are 65, the number of pixels having a third color combination (R3, G3, B3) are 6878, the number of pixels having a fourth color combination (R4, G4, B4) are 2356, and the number of pixels having a fifth color combination (R5, G5, B5) are 446. The 3D histogram may show the number counts (e.g., 10234, 65, 6878, 2356, and 446) along the y-axis, and may show the first to the fifth color combinations along the x-axis. The x-axis of the histogram may represent the percentage values corresponding to the number counts, instead of the number counts. In another example embodiment, the color extractor 320 may extract a two-dimensional (2D). The 2D histogram may be extracted from the text detection area 501, to identify a distribution of color combinations in the text detection area 501.

Depending on example embodiments, the color extractor 320 may quantize and process all of pixel values based on specific multiples (e.g., multiples of 4) that have a same base number (e.g., 4), to reduce a computational amount used when extracting the 3D histogram. For example, when acquiring a histogram for a pixel of R:123, G:234, B:5, the color extractor 320 may change R:123, G:234, B:5 to multiples of 4, such as R:124, G:236, B:8 which are closest to the original numbers (e.g., R:123, G:234, B:5), respectively. In the case of processing quantization, a computational amount and time used to extract the histogram may be reduced.

Figure 8:
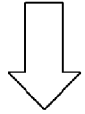
FIGS. 8 to 10 illustrate examples of a base color selection process according to at least one example embodiment.

Referring again to FIG. 6, in operation S63, the color extractor 320 may extract two dominant base colors from among all the pixel colors distributed in the text detection area 501. For example, referring to FIG. 8, the color extractor 320 may cluster a color distribution of an original image corresponding to the text detection area 501 into two colors using a K-mean algorithm. As a clustering result, an image with the same size as that of the original image of the text detection area 501 may be generated and a kind of a label value may be included in the generated image. In the case of clustering using two colors, a label of 1 or 2 may be included in the image.

Figure 9:
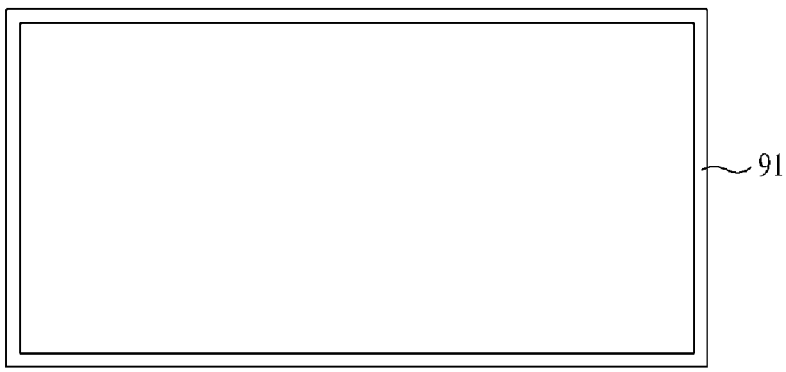
Figure 10:
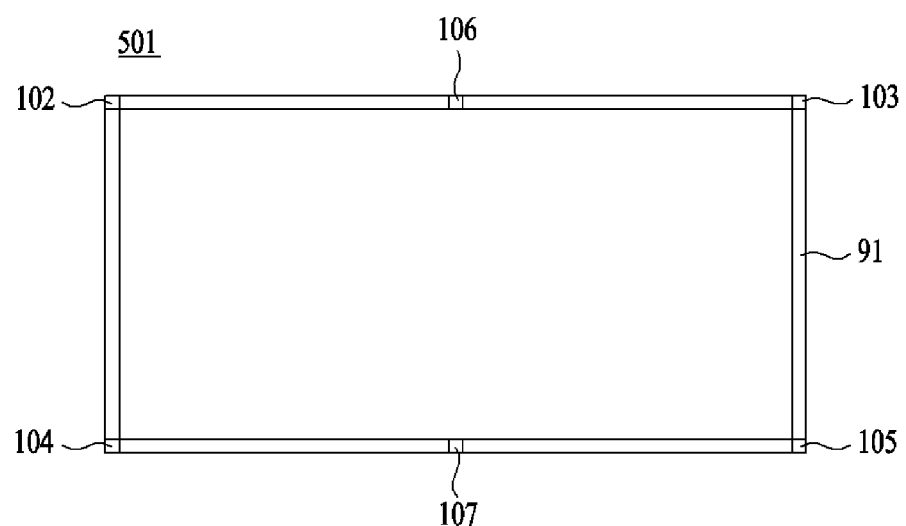

The color extractor 320 may select one of the two base colors as a background base color and may select a remaining one as a text base color. For example, referring to FIG. 9, the color extractor 320 may sum a number of pixels with the label of 1 and a number of pixels with the label of 2 while searching a border area 91 of four sides that form the text detection area 501. Here, the color extractor 320 may search the border area 91 with a size of a single pixel and may search the border area 91 with a preset size, for example, a size of two or more pixels. In addition to searching the border area 91 of four sides that form the text detection area 501, the color extractor 320 may search a partial boarder area (e.g., a left upper end, a left lower end, a right upper end, and a right lower end) among the four sides. When the color extractor 320 may determine that a first label (e.g., "2") is assigned to a more number of pixels than a second label (e.g., "1"), the color extractor 320 may select a color corresponding to the first label as the background base color and may select another color corresponding to the second label as the text base color. The background base color is selected by searching the border area 91 of the text detection area 501 since a number of pixels corresponding to the background is greater than a number of pixels corresponding to the text in the border area 91. In addition to a method of selecting a color most widely distributed in the border area 91 as the background base color, the color extractor 320 may also select a color of a pixel present at a preset specific position in the border area 91 as the background base color. For example, referring to FIG. 10, the color extractor 320 may select a color of a pixel 102 at a top-left corner in the border area 91 as the background base color. Alternatively, the color extractor 320 may select, as the background base color, a color of a pixel 103 at the top-right corner, a pixel 104 at the bottom-left corner, a pixel 105 at the bottom-right corner, a central pixel 106 of an upper-end border, a central pixel 107 of a lower-end border in the border area 91.

Figure 11:
FIG. 11 illustrates an example of a histogram alignment process according to at least one example embodiment.

Referring again to FIG. 6, in operation S64, the color extractor 320 may align values of the histogram extracted in operation S62. Referring to FIG. 11, the color extractor 320 may arrange the 3D histogram (e.g., the y-axis values of the 3D histogram, which represent the numbers of pixels corresponding to the plurality of color combinations, respectively) by size, in the order of decreasing the numbers of pixels, or in the order of increasing the numbers of pixels. Here, the aligned histogram may be used as a histogram for text color and a histogram for background color.

Referring again to FIG. 6, in operation S65, the color extractor 320 may select a representative background color and a representative text color based on the base colors extracted in operation S63 and the histogram aligned in operation S64. The color extractor 320 may acquire a color distance value based on the histogram aligned in operation S64 and the base colors extracted in operation S63 and may select a best color accordingly. For example, a method of calculating a color distance may use a Euclidean method. A distance between a histogram color combination and a base color may be calculated using the Euclidean method.

Referring to FIG. 12, the color extractor 320 may calculate a distance between a histogram color combination and a base color in alignment order of the histogram with respect to each of the text base color and the background base color. The color extractor 320 may select, as a representative text color, a pixel color 121 of which a distance from a text base color is shortest or less than or equal to a threshold, for example, 40, and may select a pixel color 122 of which a distance from a background base color is shortest or less than or equal to a threshold as a representative background color. A characteristic of a representative color shows a color distribution most frequent within a corresponding image and has a color similar to a base color. In response to absence of a pixel of which a distance from the base color is less than or equal to the threshold, the aforementioned process is performed again by increasing the threshold.

Accordingly, the color extractor 320 may acquire the representative text color and the representative background color most suitable for the corresponding image based on a histogram and a dominant color for an original image of a text detection area.

A color extraction method according to an example embodiment may translate a text in a given image and may use the text in various environments in addition to a provided environment. For example, it is possible to translate a text in a real-time image captured through the electronic device 110 and to retrieve and overlay a suitable color on a translation result. As another example, it is possible to retrieve a representative color of an image object and to use the retrieved color as a color that constitutes a user interface (UI) associated with the image object. For example, a representative color of icons displayed on a screen of the electronic device 110 may be retrieved and used as a background theme color. Here, a color similar to an outer area of an icon and a color dissimilar therefrom may be extracted as two colors that represent the icon. As another example, the color extraction method may be used to detect a scene change in a video. For example, a representative color may be extracted from each of a previous frame and a current frame and, if a difference in representative color between the previous frame and the current frame is greater than or equal to a desired level, the scene may be determined to have changed. Further, a point in time at which the scene is determined to have changed based on a method of extracting the representative color may be set as a position at which additional content, for example, advertising, is inserted.

According to some example embodiments, in providing a result of translating a text in an image to be overlaid on the corresponding image, it is possible to minimize sense of disparity for a translation result area on the image by extracting a representative text color and a representative background color from a text detection area and by applying the extracted representative text color and representative background color as a text and a background of a translation result area.

The systems or the apparatuses described herein may be implemented using hardware components, software components, and/or a combination thereof. For example, a processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method implemented by a computer system comprising at least one processor, the method comprising:
    detecting a first area that comprises a text in a given image;
    extracting, from the first area, a representative text color that represents the text and a representative background color that represents a background of the first area;
    overlaying, on the given image, a second area that comprises a translation result of the text; and
    applying the representative text color and the representative background color to a text color and a background color of the second area,
    wherein the extracting the representative text color comprises:
        extracting a histogram for a plurality of pixels of the first area;
        extracting a text base color based on a color distribution of the first area; and
        selecting the representative text color based on a first distance value between the histogram for the plurality of pixels of the first area and the text base color.

2. The method of claim 1, wherein the detecting comprises detecting the first area using an optical character reader (OCR).

3. The method of claim 1, wherein the extracting the representative background color comprises:
    extracting a background base color based on the color distribution of the first area; and
    selecting the representative background color based on a second distance value between the histogram for the plurality of pixels of the first area and the background base color.

4. The method of claim 3, wherein the extracting the representative text color and the representative background color further comprises transforming the first area to a preset form through an image perspective transform algorithm.

5. The method of claim 3, wherein the extracting the representative text color and the representative background color further comprises sorting the histogram by size.

6. The method of claim 3, wherein the extracting the histogram comprises extracting a three-dimensional (3D) histogram according to a color channel combination for the plurality of pixels of the first area.

7. The method of claim 3, wherein the extracting the histogram comprises quantizing all of pixel values of the first area based on multiples having a same base number.

8. The method of claim 3, wherein the extracting the text base color and the background base color comprises:
 clustering the color distribution of the first area using a first color and a second color through a K-mean algorithm;
 summing a first number of pixels for the first color and a second number of pixels for the second color with respect to a border area of the first area; and
 in response to the first number of pixels being greater than the second number of pixels, selecting the first color as the background base color and selecting the second color as the text base color.

9. The method of claim 3, wherein the selecting the representative text color comprises:
 selecting a first pixel color of which the first distance value is less than or equal to a threshold as the representative text color; and
 wherein the selecting the representative background color comprises:
 selecting a second pixel color of which the second distance value is less than or equal to the threshold as the representative background color.

10. The method of claim 9, further comprising: increasing the threshold in response to absence of a pixel less than or equal to the threshold.

11. The method of claim 1, further comprising:
 extracting a representative object color of an image object; and
 applying the representative object color as a color that constitutes a user interface (UI) associated with the image object.

12. The method of claim 1, further comprising:
 extracting a representative icon color of an icon and applying the representative icon color as a background theme color.

13. The method of claim 1, further comprising:
 extracting a representative previous frame color and a representative current frame color from a previous frame and a current frame of a video, respectively; and
 detecting a scene change based on a difference between the representative previous frame color and the representative current frame color.

14. A computer system comprising:
 at least one processor configured to execute computer-readable instructions stored in a memory, to:
 detect a first area that comprises a text in a given image;
 extract, from the first area, a representative text color that represents the text and a representative background color that represents a background of the first area;
 overlay a second area that comprises a translation result of the text on the given image; and
 apply the representative text color and the representative background color to a text color and a background color of the second area,
 wherein the at least one processor is configured to execute the computer-readable instructions to extract the representative text color by:
 extracting a histogram for a plurality of pixels of the first area;
 extracting a text base color based on a color distribution of the first area; and
 selecting the representative text color based on a first distance value between the histogram for the plurality of pixels of the first area and the text base color.

15. The computer system of claim 14, wherein the at least one processor is further configured to execute computer-readable instructions to:
 extract a background base color based on the color distribution of the first area, and
 select the representative background color based on a second distance value between the histogram for the plurality of pixels of the first area and the background base color.

16. The computer system of claim 15, wherein the at least one processor is further configured to execute computer-readable instructions to:
 extract a three-dimensional (3D) histogram according to a color channel combination for the plurality of pixels of the first area.

17. The computer system of claim 15, wherein the at least one processor is further configured to execute computer-readable instructions to:
 quantize all of pixel values of the first area based on multiples having a same base number.

18. The computer system of claim 15, wherein the at least one processor is further configured to execute computer-readable instructions to:
 cluster the color distribution of the first area using a first color and a second color through a K-mean algorithm,
 sum a first number of pixels for each of the first color and a second number of pixels for the second color with respect to a border area of the first area, and
 in response to the first number of pixels being greater than the second number of pixels, select the first color as the background base color and select the second color as the text base color.

19. The computer system of claim 15, wherein the at least one processor is further configured to execute computer-readable instructions to:
 select a first pixel color of which the first distance value is less than or equal to a threshold as the representative text color, and
 select a second pixel color of which the second distance value is less than or equal to the threshold as the representative background color.

20. A method implemented by a computer system comprising at least one processor, the method comprising:
 detecting a first area that comprises a text in a given image;
 extracting, from the first area, a representative text color that represents the text and a representative background color that represents a background of the first area;
 overlaying, on the given image, a second area that comprises a translation result of the text; and
 applying the representative text color and the representative background color to a text color and a background color of the second area, wherein extracting the representative background color comprises:
  extracting a histogram for a plurality of pixels of the first area;
  extracting a background base color based on a color distribution of the first area; and
  selecting the representative background color based on a first distance value between the histogram for the plurality of pixels of the first area and the background base color.

\* \* \* \* \*